United States Patent [19]
Trocciola et al.
[11] Patent Number: 4,755,439
[45] Date of Patent: Jul. 5, 1988

[54] FUEL CELL CONFIGURATION FOR CONTAMINATED FUEL GASES AND METHOD OF USING THE SAME

[75] Inventors: John C. Trocciola, Glastonbury; Richard D. Sawyer, Canton, both of Conn.

[73] Assignee: International Fuel Cells Corporation, South Windsor, Conn.

[21] Appl. No.: 32,202

[22] Filed: Mar. 25, 1987

[51] Int. Cl.[4] .......... H01M 8/06

[52] U.S. Cl. .......... 429/22; 429/34; 429/41

[58] Field of Search .......... 429/17, 19, 22, 34, 429/41

[56] References Cited

U.S. PATENT DOCUMENTS 4,620,914 11/1986 Abens et al. .......... 429/17

FOREIGN PATENT DOCUMENTS 0119166 7/1983 Japan .......... 429/17

*Primary Examiner*—Donald L. Walton
*Attorney, Agent, or Firm*—William W. Jones

[57] ABSTRACT

The fuel cell system is adapted to be able to operate with oxygen-contaminated hydrogen-rich fuel gases without experiencing undesirably high temperature hot spots on the fuel cell electrodes. Oxygen in the fuel gas is catalytically burned in areas of the electrodes where no electrochemical reaction occurs. The oxygen content of the fuel gases is thus reduced to an acceptable level before the fuel gases flow over the portions of the electrodes which are electrochemically active. Anode exhaust can also be partially recirculated into the anode inlet to mix with incoming fuel gas thereby preliminarily diluting the amount of oxygen in the incoming fuel gases.

12 Claims, 1 Drawing Sheet

FUEL CELL CONFIGURATION FOR CONTAMINATED FUEL GASES AND METHOD OF USING THE SAME

DESCRIPTION

1. Technical Field

This invention relates to an improved fuel cell system which can utilize oxygen-contaminated fuel without developing localized undesirably high temperature hot spots on the electrodes. More particularly, this invention relates to a fuel cell system wherein the excess oxygen content of the fuel is diluted and/or catalytically burned prior to the fuel reaching the electrochemically active portions of the electrodes.

2. Background Art

The raw hydrogen-contaminating fuel used by a fuel cell system as the anode gas can be produced by a variety of processes, such as: steam reforming; coal gasification; water electrolysis; and/or partial oxidation of hydrocarbons. Additionally, the hydrogen can be a byproduct of an industrial process, such as the production of chlorine and lye and the production of sodium chlorate. In many of these processes, the resultant hydrogen will be contaminated with oxygen. When oxygen-contaminated hydrogen is fed into the anode side of a fuel cell, the hydrogen and oxygen burn when exposed to the platinum catalyst. This burning occurs in the electrochemically active platinum coated areas of the electrodes where the hydrogen is also taking part in the exothermic electrochemical reaction. The heat removal or cooling system of the cell assemblies is designed to operate effectively at temperatures in ranges which are typically seen to result from the heat generated by the electrochemical reaction. Additional cooling requirements, as may be imposed by extreme loads, or by high ambient operating temperatures, are generally not effectively handled by the conventional cooling system, and can result in cell damage. The aforesaid undersirable "additional cooling requirements" will be imposed on a fuel cell assembly cooling system when the assembly utilizes a raw fuel which contains more than about 0.2% oxygen contaminant if steps are not taken to reduce the concentration of the oxygen contaminant before the fuel gas reaches the electrochemically active zones on the fuel cell system electrodes. The reason for this is that burning of the contaminant oxygen by chemical combination with the hydrogen, hereinafter referred to as burning of contaminated oxygen, will occur concurrently with the electrochemical reaction of hydrogen at certain areas of the cell electrodes thus markedly elevating the cell temperature in these areas. This phenomenon can cause localized cell damage, and also raises the overall average operating temperature of the cell system to levels which cannot be dealt with effectively by the assembly cooling system.

DISCLOSURE OF INVENTION

In the fuel cell system of this invention, the concentration of oxygen in the hydrogen fuel gas is lowered to a level of about 0.2% by separately burning and/or diluting the oxygen contaminant before the fuel gas reaches the electrochemically active portions of the electrodes in the system. We have discovered that an oxygen level of about 0.2% does not unduly increase the heat generated in the electrochemically active portions of the cells to levels which cannot be satisfactorily handled by conventional cooling systems. When the oxygen contaminant is present in the fuel gas at levels in the range of about 0.2% to about 0.5%, the reduction is accomplished by burning a portion of the oxygen contaminant on the electrodes electrode structure before the fuel gas reaches the electrochemically active areas of the electrodes. When the oxygen contaminant is above about 0.5%, the fuel gases can be mixed with recirculated anode exhaust prior to the segregated oxygen burning step.

The segregated burning of the oxygen contaminant is accomplished by extending the anode catalyst layer toward the fuel gas inlet side of the electrodes in the system. At the same time, the cathode catalyst will not be extended. Thus, there will be a strip of anode catalyst which will extend from the electrochemically active part of the cell toward the fuel gas inlet, over which catalyst strip, the fuel gas will have to pass before reaching the electrochemically active area of the cell. It will be appreciated that the electrochemically active areas of the cell are only those areas where the anode catalyst and the cathode catalyst layers are coextensive on the electrodes. When the oxygen contaminated fuel gases are fed into the electrochemically active areas of the cells, heat will be generated by both burning of the oxygen and by the electrochemical reaction of the hydrogen in the same areas. These two reactions generate heat concurrently so that higher than normal operating temperatures will occur locally in the cells. When the oxygen contaminant is pre-combusted or reacted by the extended anode catalyst strip, there are no excessively hot zones produced in the cells, so that the overall average system temperatures are lower, and can be adequately handled by the conventional system cooling assemblies. When the fuel gas entering the cells has an oxygen content of above about 0.5%, a portion of the exhaust from the anode side of the cells is recirculated back to mix with the entering fuel gas. Since the anode exhaust is substantially oxygen-free, a predictable dilution of oxygen in the incoming fuel can be obtained by recirculation. The objective of the recirculation is simply to lower the concentration of oxygen in the incoming fuel gas to about 0.5%.

It is, therefore, an object of this invention to provide an improved fuel cell system which can operate effectively using oxygen-contaminated anode fuel gas.

It is an additional object of this invention to provide a fuel cell system of the character described wherein the oxygen-contaminated fuels can be used without creating unduly high operating temperatures.

It is a further object of this invention to provide a fuel cell system of the character described wherein excess oxygen contaminant is catalytically burned in the cells in zones on the electrodes which are noncoextensive with the electrochemically active zones on the electrodes.

It is yet another object of this invention to provide a fuel cell system of the character described wherein the oxygen contaminant is precombusted in a catalyst coated zone of the anode which does not participate in the electrochemical reaction.

It is another object of this invention to provide a fuel cell system of the character described wherein the precombustion zone is interposed between the fuel inlet and the electrochemically active zone in the cells so that all of the incoming fuel will have at least a portion of its oxygen contaminant precombusted before entering the electrochemically active zone.

It is also an object of this invention to provide a fuel cell system of the character described wherein anode exhaust gases are selectively recirculated and admixed with incoming fuel to initially lower oxygen concentration prior to the precombustion step.

These and other objects and advantages of this invention will become more readily apparent from the following detailed description of a preferred embodiment thereof when taken in conjunction with the accompanying drawings.

BEST MODE FOR CARRYING OUT THE INVENTION

Figure 1:
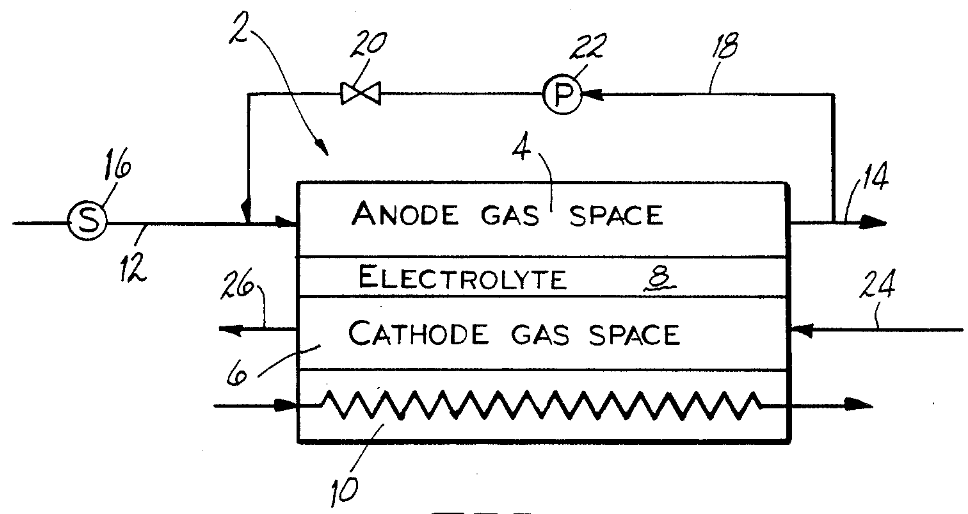
FIG. 1 is a schematic representation of a fuel cell system which operates in accordance with this invention.

Referring to FIG. 1, the stack portion, which is denoted generally by the numeral 2, of a fuel cell power system adapted to operate in accordance with this invention is shown. The stack 2 has an anode side 4, and cathode side 6 and an electrolyte matrix 8 between the two. A cooling portion 10 is also included. The hydrogen-rich fuel gas enters the anode side 4 through line 12 and is exhausted from the stack 2 through line 14. An oxygen sensor 16, which is preferably one which will not overheat in the presence of the contaminant, may be disposed in the inlet line 12 to continuously monitor the percent of oxygen contaminant in the fuel gas entering the stack 2. On the exhaust side 14 of the anode passage 4, there is disposed a recirculation loop 18 which may be used to recirculate anode exhaust from the line 14 back to the inlet line 12 to mix with the incoming anode fuel gas. A valve 20 may be included in the line 18 and can be selectively opened to cause recirculation of the anode exhaust. Likewise, a pump 22 may be included in the line 18 to control the rate of recirculation of anode exhaust gases. The valve 20 and pump 22 would be controlled by the sensor 16 so that when the sensor 16 detects an oxygen level of more than a predetermined value, for example, 2%, then the valve 20 and pump 22 will be activated to recirculate anode exhaust back to the inlet line 12. Since substantially all of the oxygen in the fuel gas will be consumed in the anode, the anode exhaust will be substantially oxygen-free so that recirculating the anode exhaust can bring the oxygen level in the incoming fuel down to manageable levels of about 0.5% or so. On the cathode side 6 of the stack 2 the air enters through line 24 and is exhausted through line 26. It will be understood that the sensor, the recirculation valve and pump are merely options, and are not essential to the recirculation of anode exhaust gases back to the anode inlet.

Figure 2:
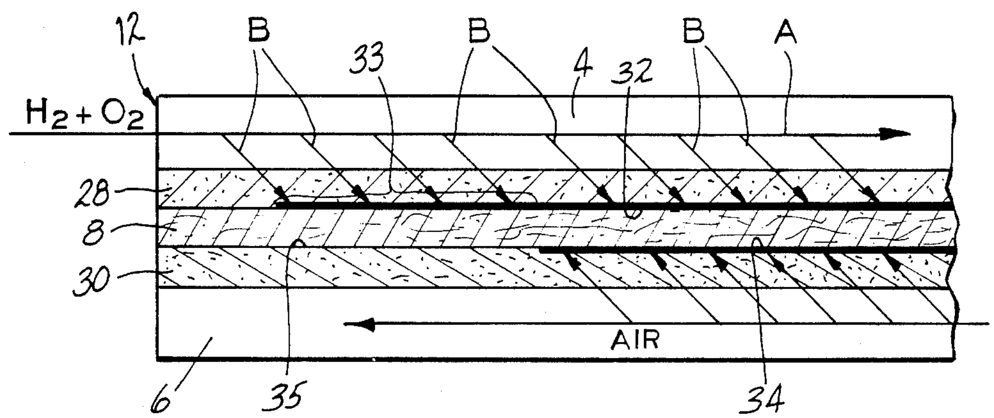
FIG. 2 is a fragmented sectional view of a cell configured to operate in accordance with this invention.

Referring to FIG. 2, the interior of one of the cells is shown. On the anode side of the matrix 8 there is an anode electrode substrate 28 and on the cathode side there is a cathode electrode substrate 30. The substrates 28 and 30 are both porous carbon plates through which the reactants can diffuse toward the matrix 8. The matrix 8 contains the electrolyte, and may be formed from silicon carbide, polyarylsulfone, phenolic resin, or boron phosphate, for example. Deposited on the surface of the anode substrate 28 adjacent to the matrix 8 is an anode catalyst layer 32, and deposited on the surface of the cathode substrate 30 adjacent to the matrix 8 is a cathode catalyst layer 34. The catalyst in the layers 32 and 34 may be platinum, platinum on carbon, or platinum ruthenium alloys, for example. It will be noted that the anode catalyst layer 32 includes a strip thereof 33 which is disposed opposite a portion 35 of the cathode substrate 30 on which there is no catalyst layer 34. The anode catalyst layer 32 thus terminates closer to the inlet side 12 of the anode gas space 4 than the cathode catalyst layer 34. Since the strip 33 has only one catalyst layer adjacent the matrix 8, there will not be any electrochemical reaction between hydrogen from the anode side 4 and the oxygen from the cathode side 6 in the matrix 8 adjacent to the strip 33. The oxygen-contaminated hydrogen fuel gas flows into the system in the direction of the arrow A, shown in FIG. 2 from the inlet side 12 of the anode gas space 4. The fuel gas thus must flow over the extended catalyst strip 33 before it reaches the electrochemically active area of the cell between the catalyst layers 32 and 34. As soon as the fuel gas enters the anode gas space 4, the hydrogen and oxygen molecules begin to diffuse through the porous anode substrate 28 toward the matrix 8, as indicated by the arrows B. The oxygen and hydrogen that diffuse through the substrate 28 to the catalyst strip 33 will combine exothermically to form water at the catalyst strip 33. This reaction at the strip 33 will lower the amount of oxygen in the fuel gas before the latter reaches the electrochemically active area of the cell, i.e., that portion of the matrix 8 which lies between the catalyst layers 32 and 34. At the same time, there will be no electrochemical reaction of hydrogen in the area of the strip 33 since there is no corresponding cathode catalyst 34 opposite the strip 33. This means that the only heat generated in the area of the strip 33 will be from the exothermic thermal chemical oxygen-lowering reaction. This heat is thus isolated from the electrochemical portion of the cell. In this manner, the inlet margins of the electrochemical portions of the cell will not be subjected to abnormally high operating temperatures which would otherwise result were the oxygen contaminant allowed to burn in electrochemically active sites in the cells.

We have found that reduction of the percentage of oxygen in the fuel gas to about 0.2% by the time the fuel gas reaches the electrochemically active areas of the cell will result in operating temperatures which do not overly burden the cooling system or create cell damage potential.

One parameter in the cell which will influence the operability of a cell structure formed in accordance with this invention, and which can be varied and controlled, is the rate at which oxygen can diffuse through the electrode substrate to get to the extended catalyst strip. If the diffusion rate of oxygen through the electrode substrate is high, then more oxygen will be burned in the extended catalyst strip and less oxygen will reach the electrochemically active portion of the cell. Typical fuel cell electrode substrates will have oxygen diffusion limits which are equivalent to cell current densities in the range of about 800 to 3,000 amps per square feet. The current density produced by the electrode structures will be proportional to the moles of oxygen diffused through the substrate per hour per square foot of substrate. This rate will be independent of internal cell pressure at normal operating pressures. One way to vary or control the rate of diffusion of oxygen through the substrate is to vary the density of the substrate, in view of the fact that the oxygen can diffuse faster through the less dense, more porous substrate. Another way is to control the concentration of oxygen in the hydrogen by recycle. If desired, localized density alteration can be accomplished by the use of polytetrafluoroethylene (PTFE) fillers, or the like.

The limiting diffusion rate for oxygen in an electrode substrate is mathematically $6.578\times10^{-4}$ times the limiting current density of the substrate, according to Faraday's Law. The local heat release from burning this oxygen will then be 0.2 times the limiting current density of the substrate. The limiting current density is the standard limiting density times the percent of oxygen in the fuel gas.

The following table gives the heat release values for three different substrate standard limiting current densities at various oxygen concentration levels in the fuel gas, the heat released being in units of Btu per hour per square foot of substrate.

| % $O_2$ | x | Standard Limiting Current Density | x | Constant | = | Heat Released |
|---|---|---|---|---|---|---|
| 3.0 | x | 3000 | x | .2 | = | 1800 |
| 2.0 | x | 3000 | x | .2 | = | 1200 |
| 1.0 | x | 3000 | x | .2 | = | 600 |
| .5 | x | 3000 | x | .2 | = | 300 |
| 3.0 | x | 1500 | x | .2 | = | 900 |
| 2.0 | x | 1500 | x | .2 | = | 600 |
| 1.0 | x | 1500 | x | .2 | = | 300 |
| .5 | x | 1500 | x | .2 | = | 150 |
| 3.0 | x | 800 | x | .2 | = | 480 |
| 2.0 | x | 800 | x | .2 | = | 320 |
| 1.0 | x | 800 | x | .2 | = | 160 |
| .5 | x | 800 | x | .2 | = | 80 |

The term "limiting current density" in fuel cell practice is defined to mean the maximum steady-state current density that can be sustained by the electrode at the existing reactant concentration. "Standard limiting current density" is defined as limiting current density at a standard reactant concentration (in this case 100%).

The limiting current densities used are within the aforesaid range of normal limiting current densities, and are controlled by varying the maximum rate at which the oxygen can diffuse through the electrode substrate.

The following examples illustrate the operation of this invention to control localized overheating of the cells due to the use of oxygen contaminated fuel.

EXAMPLE 1

Assume the use of a conventional fuel cell design wherein the anode catalyst and the cathode catalyst are coterminous, with a 3000 amp/ft$^2$ diffusion substrate and a 1.0% oxygen contaminated fuel source, wherein the cells are arranged in a stack designed with seven cells between each pair of cooler plates, with the coolant being maintained at a temperature of 375° F. and the desired temperature of the middle cell in the set being 425° F. With this configuration, from the table it will be seen that burning of the oxygen contaminant at the coterminal catalyst layers will release a total heat of 600 Btu per hour per square foot of electrode locally at the edge of the catalyst layers. At the same time, in the same area, the electrochemical reaction of the hydrogen will release a total heat of 500 Btu per hour per square foot of electrode. There will thus be a total of 1100 Btu/hr/ft$^2$ released locally in the cells. This will raise the cell temperature locally to about 485° F. and will cause damage to the cells.

EXAMPLE 2

Assume the same stack structure, the same diffusion rate substrate, and the same oxygen contamination level of Example 1, but assume that the anode catalyst layer has been extended toward the fuel inlet side of the cells in accordance with this invention. In such a case, the 600 Btu per hour per square foot of electrode will be released in the extended catalyst strip and will not be locally augmented by heat generated by the electrochemical reaction. The electrochemically generated heat of 500 Btu per hour per square foot of electrode will be released only adjacent to the extended catalyst strip. In this example, merely by extending the anode catalyst layer toward the anode gas inlet so that it is not coterminous with the cathode catalyst layer, the local temperature of the cell is reduced to 435° F., which is an acceptable operating temperature that will not cause cell damage.

EXAMPLE 3

Assume now the same conditions prevalent in Example 2, but assume also that the density of the anode substrate adjacent to the extended catalyst strip is increased to a level which will produce a diffusion or current density limit of 1500 amps per square foot of substrate. In this case, referring to the table, it will be noted that the oxygen contaminant consumption will release only 300 Btu per hour per square foot of electrode. This heat release, as in Example 2, will be localized and will not be augmented by the 500 Btu per hour per square foot of electrode which is released by the electrochemical reaction. In this Example, the maximum local cell temperature will be less than the normal 425° F., and thus will pose no problem.

One can calculate the length which the catalyst must be extended in order to reach a target percentage of oxygen contaminant at the electrochemical area of the cell using the operating parameters set forth in Example 3. Assume that a target oxygen contaminant percentage level is 0.2%. Since the local oxygen diffusion rate is proportional to the local oxygen concentration, a good approximation of the required length of the strip extension can be made by using a Log mean $O_2$ concentration:

$$Clm = \frac{(C_1 - C_2)}{\mathrm{Ln}(C_1/C_2)}$$

to determine the average oxygen concentration. This is:

$$Clm = \frac{(2.0 - 0.2)}{\mathrm{Ln}(2.0/0.2)} = 0.78\%$$

Average oxygen consumption rate using a 1500 amp current density limit substrate above the strip will be $$\frac{1500 \times .78}{2 \times 21} = 28$$

amps per square foot.

Assuming ten square foot cells in the stack which will generate 5000 amps of current, there must be enough area in the extended catalyst strip to consume 100 amps worth of oxygen at 280 amps per square foot equivalent current density. The total strip area required is thus calculated as follows:

$$\frac{100}{5000} \times \frac{500}{280} \times 10 = 0.36 \text{ ft}^2$$

The strip of catalyst would thus be approximately 1.4 inches long on the fuel inlet side of a square cell whose area is ten square feet.

The above calculations are merely intended to illustrate the adaptability of the invention to various cell environments. The concentrations of oxygen with fuel gas which enters the cell will be controlled and kept at a target level by recirculating anode exhaust at preset volumes if necessary. As previously noted, the diffusion rates of the electrode substrate material can be locally altered by the use of additives or coatings, such as PTFE, to control the temperature generated by burning the oxygen contaminant.

It will be readily appreciated that the system of this invention can tolerate oxygen-contaminated anode fuels without causing cell damage from overheating. The basic cell and stack structures do not require extensive modifications to function properly in accordance with this invention. The invention can be incorporated into cell structures at very little additional cost.

Since many changes and variations of the disclosed embodiment of the invention may be made without departing from the inventive concept, it is not intended to limit the invention otherwise than as required by the appended claims.

We claim:

1. A fuel cell system adapted to use oxygen-contaminated hydrogen rich fuel gas, said system comprising:

(a) an electrolyte matrix;

(b) means forming an anode gas space on one side of said electrolyte matrix through which gas space the fuel gas flows from an inlet side of said gas space;

(c) means forming a cathode gas space on a side of said electrolyte matrix opposite said one side;

(d) a porous anode substrate interposed between said anode gas space and said electrolyte matrix;

(e) a porous cathode substrate interposed between said cathode gas space and said electrolyte matrix;

(f) a catalyst layer on said cathode substrate on a side thereof facing said electrolyte matrix; and (g) a catalyst layer on said anode substrate on a side thereof facing said electrolyte matrix, said catalyst layer on said anode substrate including an extended strip thereof which extends toward said anode gas space inlet side and which also extends beyond an edge of said catalyst layer on said cathode substrate closest to said anode gas space inlet side.

2. The fuel cell system of claim 1 wherein said anode substrate is densified to provide localized decreased oxygen diffusion rates only in parts of said anode substrate contiguous with said extended anode catalyst layer strip.

3. The fuel cell system of claim 1 further comprising: delivery means connected to said anode gas space inlet side for delivering the fuel gas to said anode gas space; exhaust means connected to an exhaust side of said anode gas space for conducting fuel gas exhaust from said anode gas space; and a recirculation conduit operably interconnecting said exhaust means with said delivery means for recirculating anode gas exhaust from said exhaust means to said delivery means for admixture with the incoming fuel gas.

4. The fuel cell system of claim 3 further comprising valve means in said recirculation conduit for controlling flow of fuel gas exhaust from said exhaust means to said delivery means.

5. The fuel cell system of claim 4 further comprising oxygen sensor means disposed in said delivery means for sensing the concentration of oxygen contaminant in the fuel gas in said delivery means, and said sensor means being operably connected to said valve means for opening said valve means when the sensed oxygen concentration exceeds a predetermined value, and for closing said valve means when the sensed oxygen concentration is below a predetermined value.

6. The fuel cell system of claim 5 further comprising pump means in said recirculation conduit for pumping fuel gas exhaust through said recirculation conduit when said valve means is open, said pump means being connected to and operably controlled by said sensor means for selective actuation by the latter.

7. A fuel cell system adapted to use oxygen-contaminated hydrogen rich fuel gas, said system comprising:

(a) means forming anode and cathode substrates;

(b) an electrolyte matrix sandwiched between said anode and cathode substrates;

(c) means forming an anode gas space adjacent said anode substrate, said anode gas space having an inlet side through which the fuel gas passes into said anode gas space;

(d) substantially coextensive catalyst means on said anode and cathode substrates forming an electrochemically active zone in said fuel cell system, said electrochemically active zone having an edge thereof spaced apart from said anode gas space inlet side; and (e) second catalyst means on said anode substrate only and extending from said edge of said electrochemically active zone toward said anode gas space inlet side and forming an oxygen consuming zone in said fuel cell system which is substantially electrochemically inactive, and in which oxygen in the incoming fuel gas is consumed to reduce the percentage of oxygen contaminant in the fuel gas before the latter reaches said electrochemically active zone.

8. The fuel cell system of claim 7 wherein said oxygen consuming zone is operable to reduce the percentage of oxygen in the fuel gas to about 0.2% or less prior to the fuel gas reaching said electrochemically active zone.

9. The fuel cell system of claim 7 further comprising delivery means for delivering fuel gas to said anode gas space inlet side, and exhaust means for taking fuel gas exhaust from an exhaust side of said anode gas space.

10. The fuel cell system of claim 9 further comprising recirculation conduit means for recirculating anode exhaust gas from said exhaust means to said delivery means to reduce oxygen levels in the fuel gas before the latter enters said anode gas space.

11. The fuel cell system of claim 10 further comprising valve means in said recirculation conduit means for controlling flow of anode exhaust gas from said exhaust means to said delivery means; and oxygen sensor means in said delivery means to sense oxygen levels in fuel gas in said delivery means, said sensor means being operably connected to said valve means to open or close the latter in response to predetermined change in oxygen concentration in the fuel gas in said delivery means.

12. The fuel cell system of claim 7 wherein localized portions of said anode substrate limited to said oxygen consuming zone are densified to provide decreased rates of oxygen diffusion from said anode gas space to said second catalyst means whereby lower operating temperatures will be maintained in said oxygen consuming zone.

* * * * *